US012056382B2

(12) United States Patent
Henderson et al.

(10) Patent No.: US 12,056,382 B2
(45) Date of Patent: Aug. 6, 2024

(54) INFERENCE IN MEMORY

(71) Applicant: QUALCOMM Incorporated, San Diego, CA (US)

(72) Inventors: Joab Henderson, Austin, TX (US); Daniel Campbell, Austin, TX (US); Ryan Pennington, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/883,869

(22) Filed: May 26, 2020

(65) Prior Publication Data

US 2021/0373790 A1 Dec. 2, 2021

(51) Int. Cl.

*G06F 3/06* (2006.01)
*G06F 13/16* (2006.01)
*G06N 20/00* (2019.01)

(52) U.S. Cl.

CPC .......... *G06F 3/0647* (2013.01); *G06F 3/0604* (2013.01); *G06F 3/0631* (2013.01); *G06F 3/0673* (2013.01); *G06F 13/1668* (2013.01); *G06N 20/00* (2019.01)

(58) Field of Classification Search

CPC .... G06F 3/0647; G06F 3/0604; G06F 3/0631; G06F 3/0673; G06F 13/1668; G06N 13/1668; G06N 20/00

See application file for complete search history.

(56) References Cited

U.S. PATENT DOCUMENTS 6,185,704 B1 2/2001 Pawate et al.
2013/0305009 A1 11/2013 Durant et al.
2019/0108145 A1 4/2019 Raghava et al.
2019/0115063 A1* 4/2019 Lea .................... G11C 11/4096

FOREIGN PATENT DOCUMENTS

WO 2009149236 A2 12/2009

OTHER PUBLICATIONS

Adibi et al., Processing-In-Memory Technology for Knowledge Discovery Algorithms, 2006, ACM, 10 pages (Year: 2006).*
Kaplan et al., PRINS: Processing-in-Storage Acceleration of Machine Learning, 2018, IEEE, 8 pages (Year: 2018).*
Hall et al., Mapping Irregular Application to DIVA, a PIM-based Data-Intensive Architecture, 1999, ACM, 18 pages (Year: 1999).*
International Search Report and Written Opinion—PCT/US2021/033436—ISA/EPO—Sep. 21, 2021.

* cited by examiner

*Primary Examiner* — Gary W. Cygiel
(74) *Attorney, Agent, or Firm* — Patterson + Sheridan, L.L.P./Qualcomm

(57) ABSTRACT

Certain aspects of the present disclosure provide a method for processing data with an enhanced memory module comprising a compute core, including: receiving data at the enhanced memory module from a host processing system; storing the data in host processing system-addressable memory; transferring the data from the host processing system-addressable memory to compute core-addressable memory; processing the data with the compute core on the enhanced memory module to generate processed data; transferring the processed data from the compute core-addressable memory to the host processing system-addressable memory; and providing the processed data to the host processing system via the host processing system-addressable memory.

30 Claims, 10 Drawing Sheets

INFERENCE IN MEMORY

INTRODUCTION

Aspects of the present disclosure relate to performing machine learning and artificial intelligence tasks in non-traditional compute hardware, and in particular to performing such tasks in memory hardware.

The demand for machine learning and artificial intelligence capabilities has increased dramatically in the age of big data. Conventionally, machine learning has been used to generate models that may then generate inferences for artificial intelligence tasks, such as predictions, classifications, and the like. As the demand for inference capability increases, computing hardware makers are seeking to expand the density of inference capability in existing compute platforms, such as desktop computers and servers, as well as in other, emerging sorts of processing systems, such as mobile devices and edge processing devices.

Traditionally, machine learning and artificial intelligence "accelerators" have been added to systems by way of hardware expansion interfaces (e.g., PCIe slots on a motherboard) to expand the capability of the underlying compute infrastructure. Unfortunately, the use of such hardware expansion interfaces for accelerators means that those same interfaces cannot be used for other purposes, such as networking, graphics rendering, security, sound processing, and other common compute tasks. Thus, adding additional machine learning and artificial intelligence optimized compute hardware to existing processing systems often comes at the expense of other essential compute components.

Accordingly, what is needed are systems and methods for adding additional machine learning and artificial intelligence compute capabilities to existing processing systems without sacrificing other essential components.

BRIEF SUMMARY

Certain aspects of the present disclosure provide an enhanced memory module, including: a compute core; and one or more dual-mode memory elements, wherein the enhanced memory module is configured to: allocate a first subset of memory in the one or more dual mode memory elements as host processing system-addressable memory and a second subset of memory in the one or more dual-mode memory elements as compute core-addressable memory; receive data from a host processing system; process the data with the compute core to generate processed data; and provide the processed data to the host processing system via the first subset of memory.

Further aspects provide a method for processing data with an enhanced memory module comprising a compute core, including: initializing the enhanced memory module by allocating a first subset of memory of the enhanced memory module as host processing system-addressable memory and a second subset of memory of the enhanced memory module as compute core-addressable memory; receiving data at the enhanced memory module from a host processing system; processing the data with the compute core on the enhanced memory module to generate processed data; and providing the processed data to the host processing system via the first subset of memory.

Further aspects provide a non-transitory computer-readable medium comprising instructions that, when executed by one or more processors of a host processing system, cause the processing system to perform a method for processing data with an enhanced memory module comprising a compute core, the method including: initializing the enhanced memory module by allocating a first subset of memory of the enhanced memory module as host processing system-addressable memory and a second subset of memory of the enhanced memory module as compute core-addressable memory; receiving data at the enhanced memory module from a host processing system; processing the data with the compute core on the enhanced memory module to generate processed data; and providing the processed data to the host processing system via the first subset of memory.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
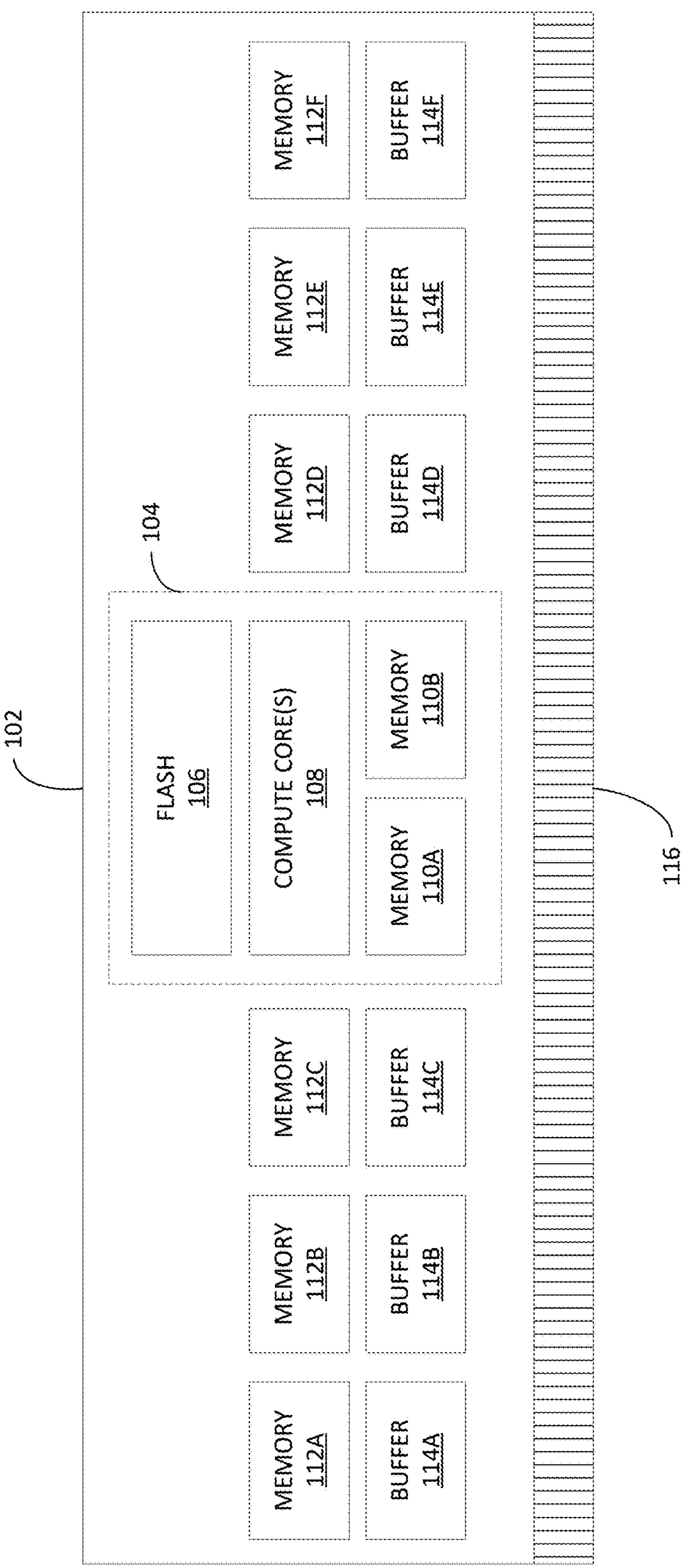
FIG. 1 depicts an example of an enhanced memory module including a memory-integrated-accelerator.

Aspects of the present disclosure provide systems and methods for adding additional machine learning and artificial intelligence compute capabilities to memory hardware in processing systems, such as computers, servers, and other computer processing devices.

Conventional computer processing system may include a processor connected to memory modules, such as DRAM modules, via an interface, such as a DIMM interface, and to other peripherals via other interfaces, such as PCIe interface. As the demand for machine learning and artificial intelligence "accelerators" has increased, one solution for existing computer processing systems has been to connect such accelerators to available system interfaces, such as available PCIe slots. However, the number of such peripheral interface slots may be limited on any given system, and in particular, conventional computer processing systems may generally include more DIMM slots than PCIe slots.

Described herein are enhanced memory modules comprising integral accelerators configured to perform machine learning and artificial intelligence tasks, such as training and inference. The memory-integrated-accelerators may be implemented, for example, in industry-standard dual inline memory modules (DIMMs), such as a Load Reduced DIMM (LRDIMM) or a Registered DIMM (RDIMM), using standard memory interfaces for data and instruction communication. In some embodiments, an enhanced memory module may be referred to as, for example, an "ML-DIMM", "AI-DIMM", or an "Inference DIMM".

In various embodiments, the memory-integrated-accelerators comprise one or more processing cores and may further be configured as a system on a chip (SoC), which is integrated into an enhanced memory module. The processing cores enable on-memory processing of data beyond conventional storage and retrieval. In particular, the processing cores may configured to perform on-memory machine learning and artificial intelligence tasks.

Further, the enhanced memory modules described herein may be configured to partition and allocate the memory elements and/or the memory space in each enhanced memory module between a host processing system, as in a standard memory module configuration, and the memory-integrated-accelerators for on-memory machine learning and artificial intelligence tasks. In some embodiments, a firmware element may configure the allocation of memory between host processing and on-memory processing at boot time.

The partitioning of memory in enhanced memory modules may be also configured dynamically by programs, applications, installed on a device including the enhanced memory modules so that overall processing system performance may be tuned for different tasks and performance needs. Beneficially then, enhanced memory modules may be configured to act as normal memory modules, maximizing the capacity of available memory to a host processing system, or may be configured to allocate some or all of that memory to memory-integrated-accelerators, maximizing the machine learning and artificial intelligence compute capacity of the host processing system.

Embodiments described herein thus beneficially enable additional compute resources to be utilized by processing systems for compute tasks, such as machine learning and artificial intelligence tasks, without removing or preventing the use of other essential components due to lack of available interfaces (e.g., PCIe), without adding or modifying additional physical interfaces, and without the need to implement entirely new interfaces. The additional compute resources greatly increase the capacity for existing processing systems as well as new processing systems. Further, embodiments described herein utilize a dual-operating mode architecture that beneficially allows users to select configure different operating modes different situation to maximize the utility of processing systems.

Embodiments described herein may be used in many contexts. For example, data centers employing servers may implement the embodiments described herein to procure fewer servers while having the same amount of compute capacity, which saves on equipment cost, electric and cooling costs, space costs, and also provides for a more power-efficient processing center. As another example, desktop and/or consumer grade computing systems may implement the embodiments described herein to bring improved data processing capabilities to the home computers, rather than relying on external data processing capabilities (e.g., as provided by cloud processing services). As yet another example, internet of things (IoT) devices may implement the embodiments described herein to expand data processing capabilities into entirely new types of devices and to further enable processing (e.g., machine learning and artificial intelligence inferencing) at the "edge".

Example Enhanced Memory Module With Memory-Integrated Processing Cores

FIG. 1 depicts an example of an enhanced memory module 102 including a memory-integrated-accelerator 104. In some embodiments, enhanced memory module 102 is built according to a standardized form factor, such as an LR-DIMM form factor, or another standardized form factor for memory modules. Utilizing a standardized form factor for enhanced memory module 102 allows it to be integrated into existing processing systems without modification to underlying system interfaces or memory access protocols. In this example, memory module 102 includes pins 116 for interfacing with a DIMM slot in a processing system.

Memory module 102 includes a plurality of memory elements 112A-F, which may be, for example, dynamic random access memory (DRAM), synchronous DRAM (SDRAM), low-power double data rate (LPDDR) DRAM, high bandwidth memory (HBM), graphics DDR (GDDR) memory, and others. In some examples, memory elements 112A-F may include a mix of different types of memory elements.

Each of memory elements 112A-F is connected to an adjacent memory buffer 114A-F, which is used for buffering data reads from and data writes to memory elements 112A-F by a host processing system (not depicted).

Figure 3A:
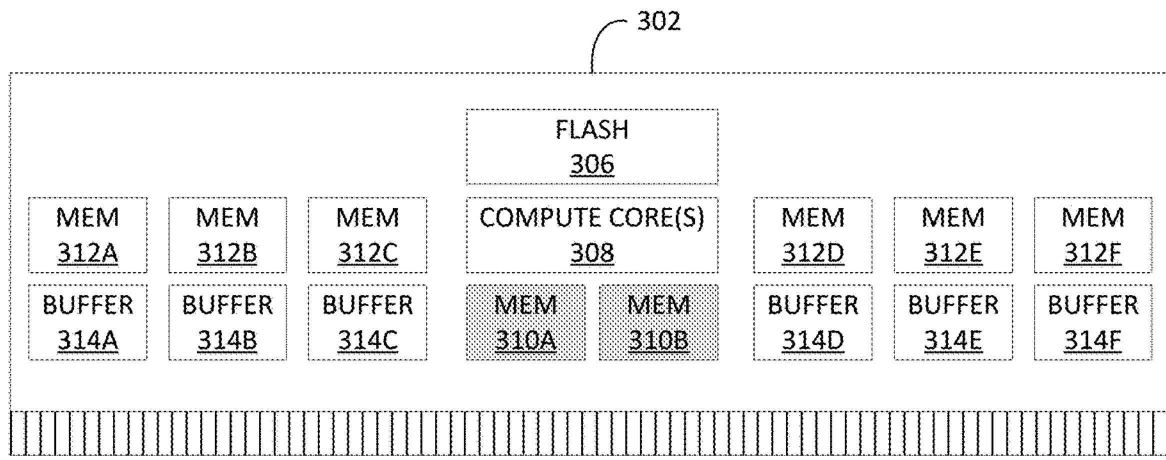
FIGS. 3A-3C depict example configurations for an enhanced memory module.
Figure 3B:
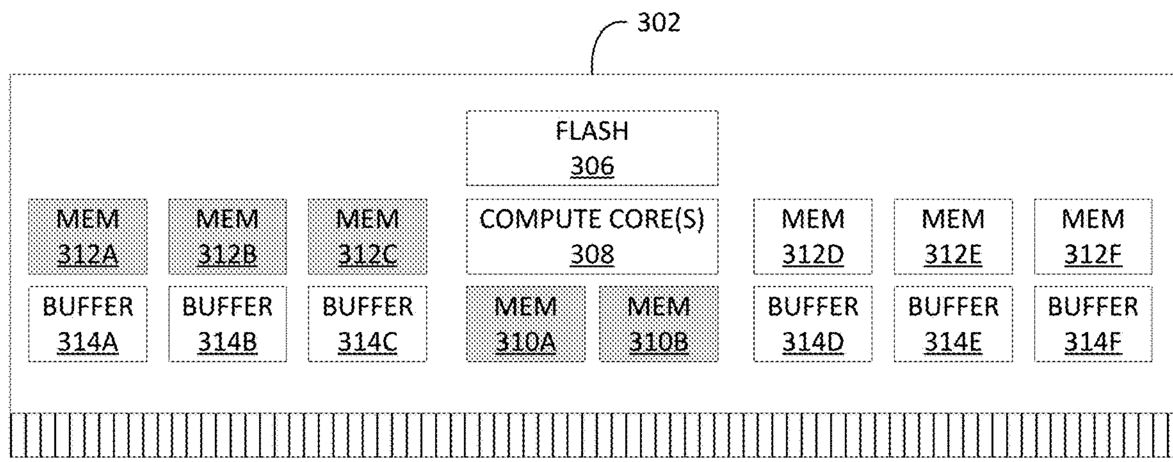
Figure 3C:
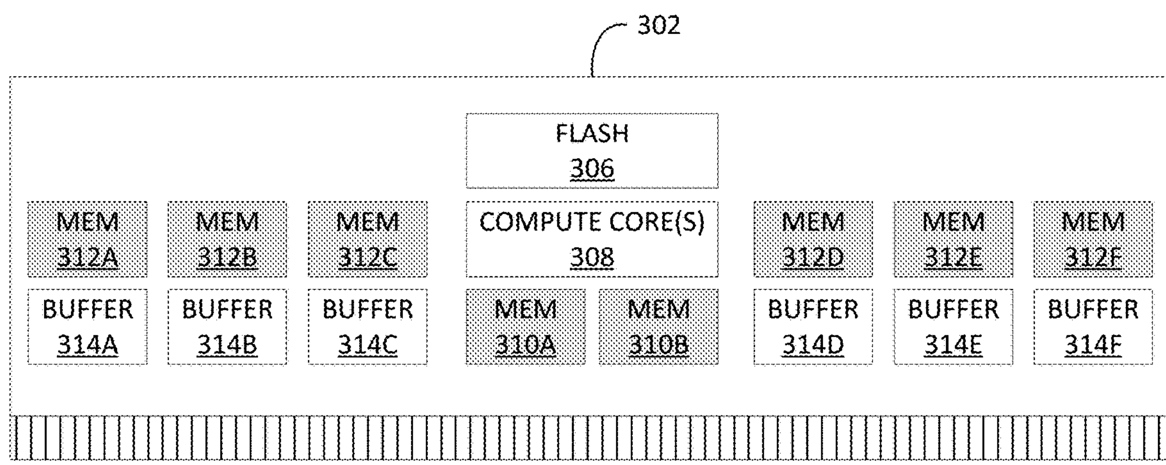

Memory elements 112A-F may generally be referred to as dual-mode or dual-purpose memory elements because their memory may be allocated, in whole or in part, to memory-integrated-accelerator 104 for performing on-memory processing and/or to a host processing system for performing conventional system memory functions. FIGS. 3A-3C describe several examples of different memory allocations.

Memory-integrated-accelerator 104 includes a flash memory 106 that is configured to store firmware, which may be configured to initialize memory module 102. For example, the firmware may be configured to initialize the compute core(s) 108 and any other logic on the enhanced memory module. Additionally, a memory controller (not depicted) may be configured to initialize memory elements 112A-F for usage by the compute core(s) 108 and/or the host processing system.

In some embodiments, initialization of memory elements 112A-F may be handled by accelerator 104, which may improve boot time (e.g., by reducing it) of the host processing system. In such cases, a memory driver of the host processing system would only need to initialize the memory interface.

In some embodiments, the firmware in flash memory module 106 may configure memory module 102 at boot time and allocate (or map) some or all of the memory capacity (e.g., including memory elements and/or memory ranges, addresses, etc.) to accelerator 104. The firmware in flash memory module 106 may be updated so that the amount of memory allocated to accelerator 104 may be changed between runtimes. In embodiments where memory from memory elements 112A-F (e.g., ranged of memory addresses) is allocated at boot time, the incorporating processing system will "see" only the remaining available memory (excluding the memory allocated to accelerator 104) and not seek to write to the memory allocated to accelerator 104, thereby avoiding memory conflicts.

In some embodiments, the firmware in flash memory module 106 may configure an initial memory allocation at boot time, which may then be changed dynamically by instructions from an incorporating processing system. In such cases, the operating system of the incorporating processing system may be configured to dynamically reallocate memory for processing system use to avoid conflicts.

Accelerator 104 further includes one or more compute core(s) 108, which may be configured to perform various types of processing tasks, including machine learning and artificial intelligence tasks like training and inference. In some embodiments, one or more of the compute cores 108 may be based on an ARM™ architecture, reduced instruction set computer (RISC) architecture, or complex instruction set architecture computer (CISC), to name just a few examples.

In some embodiments, compute core(s) 108 replace and integrate the functionality of a registry clock driver chip or circuit on a conventional memory module.

Accelerator 104 further includes a plurality of memory elements 110A-B, which are dedicated to compute core(s) 108, or in other words, single-mode or single-purpose memory elements. As memory elements 110A-B are dedicated to the compute core(s) 108, the memory associated with memory elements 110A-B are not addressable by the host processing system. The dedicated memory elements 110A-B allow accelerator 104 to always be capable of performing compute tasks. In some examples, memory elements 110A-B may be configured to load model parameters, such as weights, biases, and the like for a machine learning model configured to perform a machine learning or artificial intelligence task, such a training or inference.

In some embodiments, accelerator 104 may be implemented as a system on a chip (SOC), which is integrated with memory module 102.

Notably, the number of each type of element (e.g., memory, buffer, flash, compute core, etc.) in FIG. 1 is merely one example, and many other configurations are possible. Further, while shown with all elements on a single side of memory module 102, in other embodiments, memory module 102 may include additional elements on the opposite side, such as additional memory elements, buffers, compute cores, flash memory modules, and the like.

Example Processing System Including Enhanced Memory Modules

Figure 2:
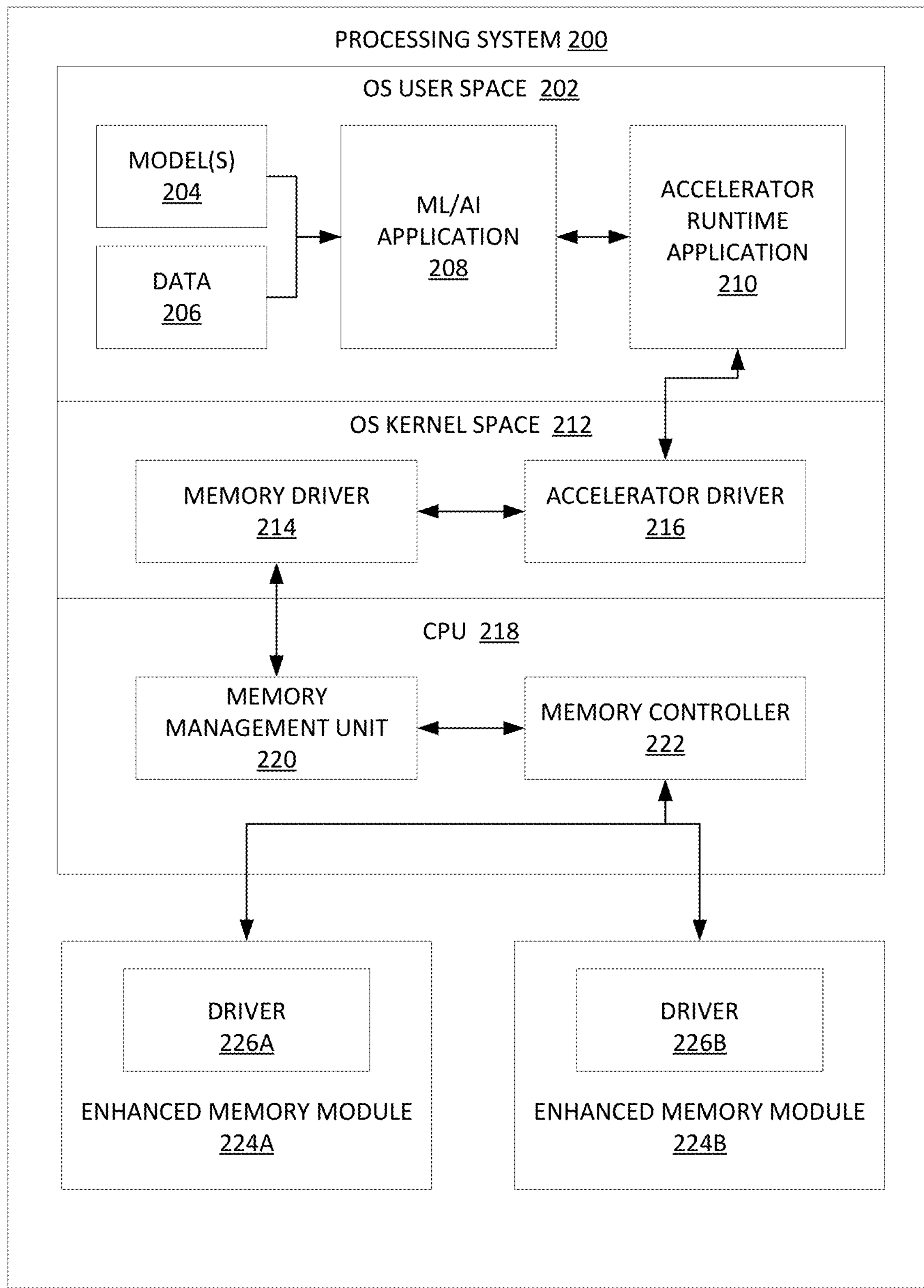
FIG. 2 depicts an example processing system including enhanced memory modules, as described with respect to FIG. 1.

FIG. 2 depicts an example processing system 200 including enhanced memory modules, such as 102 described with respect to FIG. 1.

In this example, processing system 200 implements a software stack including an operating system (OS) user space 202, OS kernel space 212, and CPU 218. The software stack is configured to interface with enhanced memory modules 224A and 224B.

Generally, an operating system may be configured to segregate virtual memory between an OS user space, such as 202, and an OS kernel space, such as 212 in order to provide memory protection and hardware protection from malicious or errant software behavior. In this example, OS user space 202 is the memory area where application software executes, such as ML/AI application 208 and accelerator runtime application 210. Whereas, kernel space 212 is memory space reserved for running, for example, a privileged operating system kernel, kernel extensions, and device drivers, such as memory driver 214 and accelerator driver 216.

Further in this example, OS user space 202 includes a machine learning and/or artificial intelligence application 208, which may implement one or more model(s) 204 (e.g., machine learning models such as artificial neural network models) configured to process data 206. Model(s) 204 may include, for example, weights, biases, and other parameters. Data 206 may include, for example, video data, image data, audio data, text data, and other types of data on which model(s) 204 may operate to perform various machine learning tasks, such as image recognition and segmentation, speech recognition and translation, value prediction, and others.

ML/AI application 208 is further configured to interface with accelerator runtime application 210, which is a user space process configured to direct data processing requests to processing accelerators, such as those found in enhanced memory modules 224A-B. Notably, while a single ML/AI application 208 is depicted in FIG. 2, this is just one example, and other types of processing applications may be present in OS user space 202 and configured to leverage the enhanced memory modules 224A-B.

Accelerator runtime application 210 is configured to interface with accelerator driver 216 in OS kernel space 212. Generally, drivers in OS kernel space 212 are software configured to control a particular type of device that is attached to a processing system, such as processing system 200. For example, a driver may provide a software interface to a hardware device, such as memory management unit 220, which enables an operating system and other computer programs to access the hardware device's functions without needing to know precise details about the hardware device.

In this example, accelerator driver 216 is configured to provide access to enhanced memory modules 224A-B by way of memory driver 214. In some embodiments, accelerator driver 216 is configured to enforce the protocol used by the enhanced memory modules 224A-B. To this end, accelerator driver 216 may interact with memory driver 214 to send commands to enhanced memory modules 224A-B. For example, such commands may be used to: move data from memory allocated to the host processing system to memory allocated to accelerators (e.g., to compute cores) of enhanced memory modules 224A-B; start processing the data; or move data from the memory allocated to accelerators to the memory allocated to the host processing system.

In some embodiments, accelerator driver 216 can implement a protocol using specific memory addresses to write to or read from memory of enhanced memory modules 224A-B. In some cases, the memory addresses may be physically mapped to an enhanced memory module. Accelerator driver 216 may also have access to memory addresses on enhanced memory modules 224A-B that are not accessible to OS user space 202, which can be used to copy the data into memory allocated to accelerators of enhanced memory modules 224A-B and then into the compute cores of those enhanced memory modules.

Further, accelerator driver 216 is configured to interface with memory driver 214. Memory driver 214 is configured to provide the low-level access to memory elements of enhanced memory modules 224A-B. For example, memory driver 214 may be configured to pass the commands generated by accelerator driver 216 directly to enhanced memory modules 224A-B. Memory driver 214 may be a part of an operating system's memory management, but may be modified to enable the enhanced memory module functions described herein. For example, memory driver 214 may be configured to block access to enhanced memory modules 224A-B during periods where data is being copied between memory allocated to accelerators (e.g., to compute cores) and to memory allocated to the host processing system within enhanced memory modules 224A-B.

Memory driver 214 is configured to interface with memory management unit (MMU) 220, which is a hardware component configured to manage memory and caching operations associated with a processor, such as CPU 218.

Memory management unit 220 is configured to interface with memory controller 222, which is a hardware component configured to manage the flow of data going to and from a host processing system's main memory. In some embodiments, memory controller 222 is a separate chip or integrated into another chip, such as being an integral part of a microprocessor, like CPU 218 (in which case it may be referred to as an integrated memory controller (IMC)). Memory controller 222 may alternatively be referred to as a memory chip controller (MCC) or a memory controller unit (MCU).

In this example, memory controller 222 is configured to control the flow of data to and from enhanced memory modules 224A-B. In some embodiments, enhanced memory modules 224A-B may be enhanced DIMMs, as described above.

Enhanced memory modules 224A-B include drivers 226A-B, respectively, which enable communication with elements of processing system 200. For example, drivers 226A-B may enable communication with other elements of processing system 200 via a DIMM interface with memory controller 222.

Generally speaking, ML/AI application 208 may request processing of data 206 via a model 204 to be performed by an enhanced memory module through accelerator runtime application 210, which communicates the request to accelerator driver 216 and then onto memory driver 214, which may be an otherwise conventional memory driver. Memory driver 214 may then route the processing instructions and data to one or more of enhanced memory modules 224A-B via memory management unit 220 and memory controller 222. This is just one example of a processing flow, and others are possible.

In some embodiments, if multiple enhanced memory modules (e.g., 224A-B) are being used for the same application (e.g., ML/AI application 208), then accelerator runtime application 210 and accelerator driver 216 may cooperate to manage the data across the system. For example, accelerator runtime application 210 may request the total available accelerator allocated memory (and number of enhanced memory modules) from accelerator driver 216 and then partition the workload between the enhanced memory modules as efficiently as possible if a single enhanced memory module cannot take the entire workload. As another example, with multiple workloads and multiple enhanced memory modules, the accelerator runtime application 210 may be configured to partition the workloads to the available enhanced memory modules to maximize performance.

CPU 218 may generally be a central processing unit comprising one or more of its own processing cores. While in this example CPU 218 is not performing the specific processing request from ML/AI application 208 that was routed to enhanced memory modules 224A-B, in other examples CPU 218 may perform parallel processing of requests from ML/AI application 208 (and other applications) in tandem with enhanced memory modules 224A-B.

Further, while certain aspects of processing system 200 have been depicted and described for this example, processing system 200 may include other components. For example, processing system 200 may include additional applications, additional hardware elements (e.g., other sorts of processing units as described with respect to FIG. 10), and the like. FIG. 2 is intentionally focused on certain elements of processing system 200 relevant to the described embodiments.

Example Operational Modes for Enhanced Memory Modules

FIGS. 3A-3C depict example memory allocation configurations for an enhanced memory module (e.g., 102 in FIGS. 1 and 224A-B in FIG. 2).

In FIG. 3A, enhanced memory module 302 is configured, for example by firmware in flash memory 306 at boot time, to only use its dedicated memory elements 310A-B for any processing by compute core(s) 308. In this configuration, enhanced memory module 302 is set to provide maximum capacity to system memory.

In FIG. 3B, enhanced memory module 302 is configured to use its dedicated memory elements 310A-B in addition to the memory space provided by memory elements 312A-C for any processing by compute core(s) 308. The memory space provided by memory elements 312D-F on the other hand is reserved for the host processing system, as with conventional system memory. Thus, in this configuration, enhanced memory module 302 is set to balance on-module compute capability with host processing system memory needs.

In FIG. 3C, enhanced memory module 302 is configured to use its dedicated memory elements 310A-B in addition to the memory space provided by memory elements 312A-F for any processing by compute core(s) 308. Thus, in this configuration, enhanced memory module 302 is set to maximize on-module compute capability. Notably, in such a configuration, another enhanced memory module or another conventional memory module may provide host processing system addressable memory for host processing system operations.

Notably, while various memory elements are depicted as allocated to compute core(s) 308 or to host system memory in this example, this representation is for convenience. For example, virtual memory address spaces may be allocated to either on-memory computing or host system processing regardless of how those address spaces are allocated to physical memory addresses within physical memory elements (e.g., by a page table).

Further, the example configurations depicted in FIGS. 3A-3C are just a few demonstrative possibilities. The amount of host processing system memory space provided by enhanced memory module 302 and allocated to compute core(s) 308 may be in any ratio between 0 and 100% of the available, host processing system-addressable memory elements. However, in some embodiments, the ratio of memory space allocated to compute core(s) 308 may be limited such that at least some memory space on each enhanced memory module is reserved for the host system.

Figure 4:
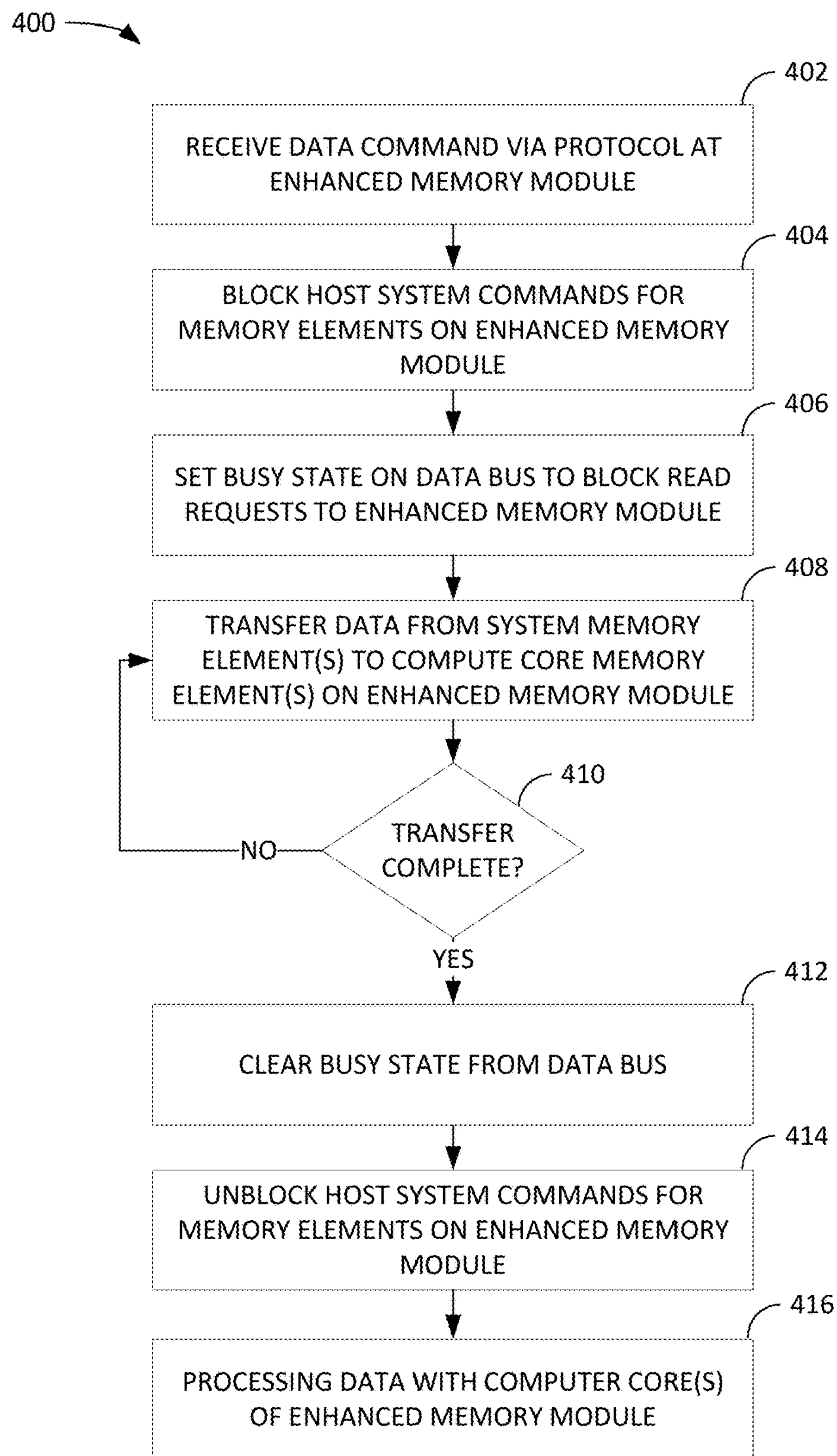
FIG. 4 depicts an example method for transferring data to a compute core memory element on an enhanced memory module.

Example Method for Transferring Data to a Compute Core Memory Element on an Enhanced Memory Module FIG. 4 depicts an example method for transferring data to a compute core memory element on an enhanced memory module (e.g., 102 in FIG. 1, 224A-B in FIGS. 2, and 302 in FIGS. 3A-C).

Method 400 begins at step 402 with receiving a data command via an enhanced memory protocol to move data into a compute core memory element on the enhanced memory module. In some embodiments, an accelerator driver, such as discussed above with respect to FIG. 2, may generate the command via the enhanced memory protocol.

Note that in this example, a compute core memory element may be a designated compute core memory element, such as memory elements 310A-B in FIG. 3, or a dual-mode memory element that has been allocated to the compute core, such as memory elements 312A-C in FIG. 3. Further, method 400 is described with respect to moving data into and out of memory elements, but this is for ease of demonstration. The memory allocated to a compute core may be a range of memory addresses, a memory space, or any other logical as well as physical memory subdivision.

Method 400 then proceeds to step 404 with blocking host processing system commands for access to memory elements on the enhanced memory module. This is to prevent any conflict while processing the data command with the compute core on the enhanced memory module.

In some embodiments, a memory driver, such as described above with respect to FIG. 2, may be configured to block the host processing system commands.

Method 400 then proceeds to step 406 with setting a busy state on a data bus to block read requests from the host processing system while data is being moved on the enhanced memory module. This is to prevent any interruption while processing the data command with the compute core on the enhanced memory module.

Method 400 then proceeds to step 408 with transferring data from memory elements allocated to the host processing system to memory elements allocated to the compute core on the enhanced memory module. As above, memory elements allocated to the compute core may include designated compute core memory elements, such as memory elements 310A-B in FIG. 3, or dual-mode memory elements that have been allocated to the compute core, such as memory elements 312A-C in FIG. 3. Here the data transferred into the compute core memory elements may include data for processing as well as instructions for how to process the data. For example, the data may include data for processing (e.g., 206 in FIG. 2), model data (e.g., 204 in FIG. 2), and processing commands.

Method 400 then proceeds to step 410 with determining whether the data transfer is complete. If not, the method returns to step 408 and continues the data transfer.

If the transfer is complete at step 410, then method 400 proceeds to step 412 where the busy state is cleared from the data bus.

Method 400 proceeds to step 414 with unblocking host processing system commands to the memory elements allocated to the host processing system so that normal memory operations with the host processing system may continue.

Method 400 then proceeds to step 416 with processing the data with one or more compute core(s) of the enhanced memory module, such as described in more detail below with respect to FIG. 6. For example, processing the data may include performing a machine learning task, such as training or inferencing.

Figure 5:
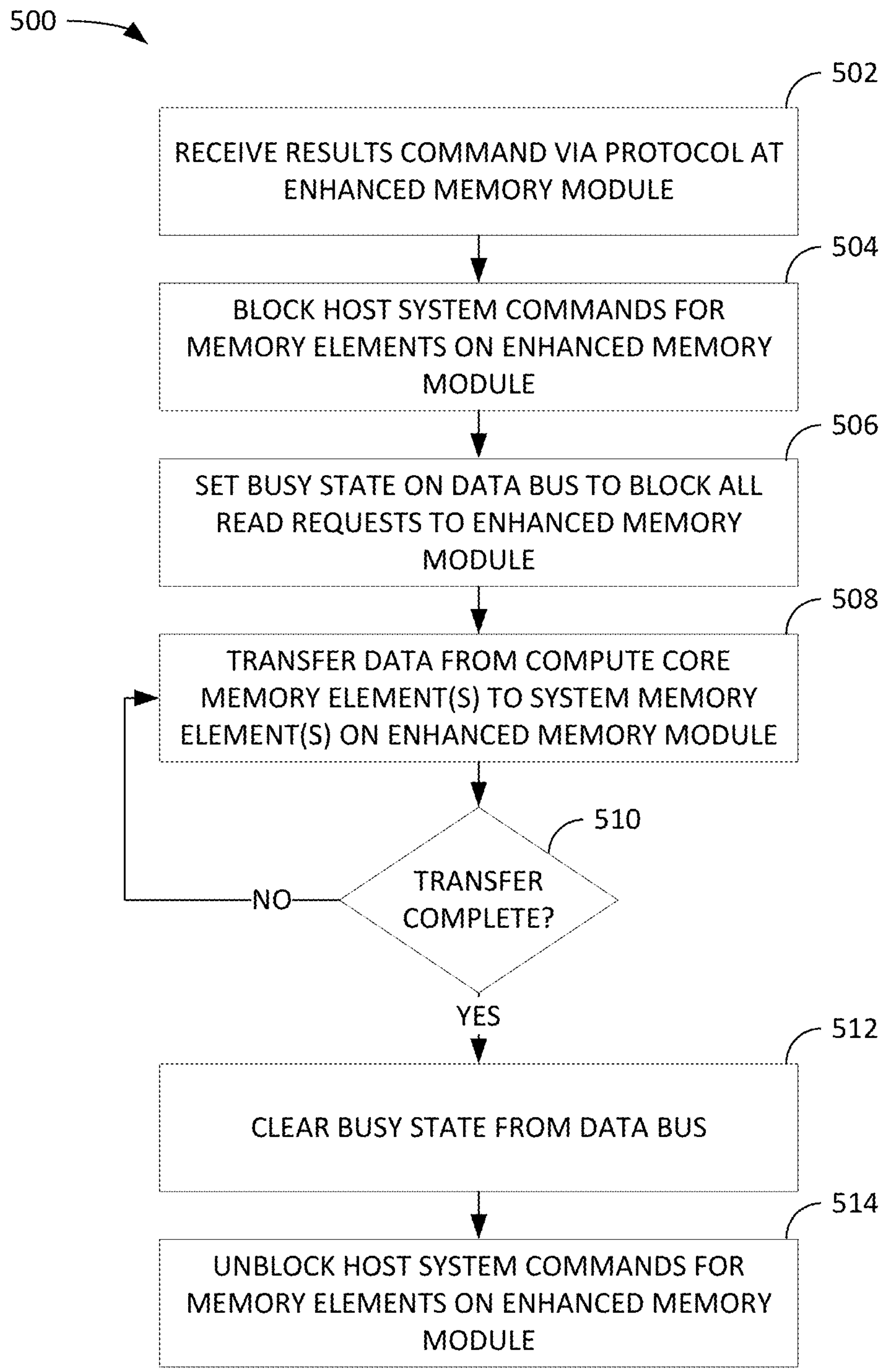
FIG. 5 depicts an example method for transferring data from a compute core memory element on an enhanced memory module.

Example Method for Transferring Data From a Compute Core Memory Element on Enhanced Memory Module FIG. 5 depicts an example method 500 for transferring data from a compute core on an enhanced memory module (e.g., 102 in FIG. 1, 224A-B in FIGS. 2, and 302 in FIGS. 3A-C). For example, method 500 may be performed after processing of data is completed at step 416 of FIG. 4.

Method 500 begins at step 502 with receiving a results command via an enhanced memory protocol to move data out of a compute core memory element on the enhanced memory module. Note that in this example, a compute core memory element may be a designated compute core memory element, such as memory elements 310A-B in FIG. 3, or a dual-mode memory element that has been allocated to the compute core, such as memory elements 312A-C in FIG. 3.

Method 500 then proceeds to step 504 with blocking host processing system commands for access to memory elements on the enhanced memory module. This is to prevent any conflict while processing the data command on the enhanced memory module.

Method 500 then proceeds to step 506 with setting a busy state on a data bus to block read requests from the host processing system while data is being moved on the enhanced memory module.

Method 500 then proceeds to step 508 with transferring data from compute core memory elements to memory elements allocated to the host processing system on the enhanced memory module. As above, memory elements allocated to the compute core may include designated compute core memory elements, such as memory elements 310A-B in FIG. 3, or dual-mode memory elements that have been allocated to the compute core, such as memory elements 312A-C in FIG. 3.

Method 500 then proceeds to step 510 with determining whether the transfer is complete. If not, the method returns to step 508 and continues the data transfer.

If the transfer is complete at step 510, then method 500 proceeds to step 512 where the busy state is cleared from the data bus.

Finally, method 500 proceeds to step 514 with unblocking host processing system commands to the memory elements allocated to the host processing system so that normal memory operations with the host processing system may continue.

Figure 6:
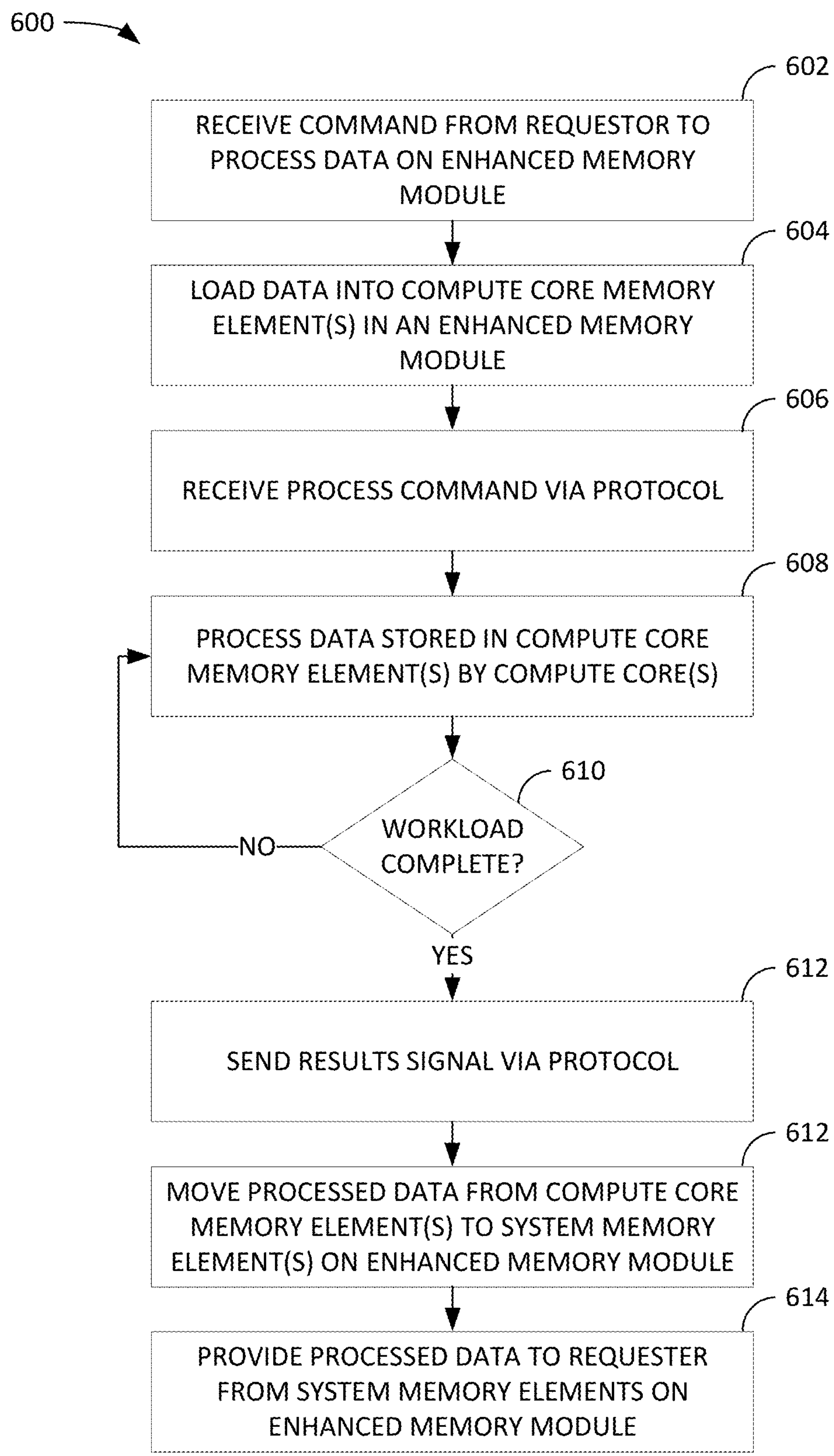
FIG. 6 depicts an example method for processing data with a compute core on an enhanced memory module.

Example Method for Processing Data With Compute Core on Enhanced Memory Module FIG. 6 depicts an example method 600 for processing data with a compute core on an enhanced memory module. For example, processing the data with a compute core of an enhanced memory module (e.g., 102 in FIG. 1, 224A-B in FIGS. 2, and 302 in FIGS. 3A-C) may take place after transferring data to a compute core memory element on an enhanced memory module, such as described above with respect to FIG. 4. The data for processing may be generated by applications, sensors, other processors, and the like. For example, the data for processing may comprise image, video, or sound data.

Method 600 begins at step 602 with receiving a command from a requestor to process data on an enhanced memory module. For example, the requestor may be a data processing application, such as ML/AI application 208 in FIG. 2.

In some embodiments, the requestor queries an accelerator runtime application (e.g., 210 in FIG. 2) to determine how many enhanced memory modules are configured in the system as well as how much memory on those enhanced memory modules is allocated to running acceleration-based workloads. The accelerator runtime application may then query an accelerator driver (e.g., 216 in FIG. 2) to get this information. With this information, the requestor can determine if the workload can fit within the configured amount of memory and execute the workload accordingly. In the event that the amount of memory available is insufficient for the workload, the requestor may reconfigure the workload, such as reducing its size or chunking the workload, so that the available memory may be utilized.

Method 600 then proceeds to step 604 with loading data into compute core memory element(s) in an enhanced memory module. As described above, the compute core memory element(s) may be dedicated memory elements or dynamically allocated memory elements. In some embodiments, step 604 is performed according to method 400 described with respect to FIG. 4.

In some embodiments, the requestor, (e.g., ML/AI application 208 in FIG. 2) will send the data to an accelerator runtime application (e.g., 210 in FIG. 2), which will then forward the data to an accelerator driver (e.g., 216 in FIG. 2). The accelerator driver may then send a protocol command to load the data to a memory driver (e.g., 214 in FIG. 2), and the memory driver will then send the command to an enhanced memory module (e.g., 224A-B in FIG. 2).

Method 600 then proceeds to step 606 with receiving a process command via an enhanced memory protocol, such as described in more detail below. The process command may be configured to cause the processing core(s) of the enhanced memory module to perform data processing of data stored in the compute core memory elements.

In some embodiments, after loading the data, an accelerator driver (e.g., 216 in FIG. 2) will send the protocol command to process the data to a memory driver (e.g., 214 in FIG. 2), which will then forward the command to an enhanced memory module (e.g., 224A-B in FIG. 2) for execution.

Method 600 then proceeds to step 608 with processing the data stored in the compute core memory elements by the compute core(s) on the enhanced memory module. In some embodiments, the processing may relate to machine learning and/or artificial intelligence tasks, such as training or inferencing. Further, in some embodiments, the machine learning task may be parallel processed across a plurality of compute cores on a single enhanced memory module, as well as across a plurality of enhanced memory modules.

Method 600 then proceeds to step 610 where, if the processing of the workload is not yet complete, then method 600 returns to step 608.

If at step 610 the processing of the workload is complete, then method 600 proceeds to step 612 where a results signal is sent via the enhanced memory protocol.

In some embodiments, an accelerator driver (e.g., 216 in FIG. 2) may periodically query an enhanced memory module (e.g., 224A-B in FIG. 2) to determine when processing is complete. When the processing is complete, the enhanced memory module may output a signal on a bus indicating that processing is complete. Then, the next time the accelerator driver queries the enhanced memory module, it will observe the results signal.

Method 600 then proceeds to step 612 where the processed data is moved from compute core memory elements to memory elements allocated to the host processing system on the enhanced memory module. For example, with respect to FIG. 3B, data may be moved from one or more of memory elements 310A-B and 312A-C, which are allocated to the compute core, to one or more of memory elements 312D-F, which are allocated to the host processing system.

In some embodiments, after the processing is complete, an accelerator driver (e.g., 216 in FIG. 2) will send a protocol command to a memory driver (e.g., 214 in FIG. 2) to retrieve the data. The memory driver will then pass the command on to the enhanced memory module, which will in-turn copy the processed data into host processing system-addressable memory.

Method 600 then concludes at step 614 where the processed data is provided to the requestor from the memory elements allocated to the host processing system on the enhanced memory module.

In some embodiments, an accelerator driver (e.g., 216 in FIG. 2) will send a command to a memory driver (e.g., 214 in FIG. 2) to read out the processed data. The memory driver will then forward these read requests to the enhanced memory module. The accelerator driver will send these results back to the requestor by way of an accelerator runtime application (e.g., 210 in FIG. 2).

Example Aspects of an Enhanced Memory Protocol

An enhanced memory protocol may be implemented for interacting with an enhanced memory module (e.g., 102 in FIG. 1 or 224A-B in FIG. 2 or 302 in FIGS. 3A-C). In some embodiments, the enhanced memory protocol may be based on or an extension of a Joint Electron Device Engineering Council (JEDEC) protocol.

In some embodiments, the enhanced memory protocol may implement a variety of commands for interfacing with a memory-integrated-accelerator, such as accelerator 104 described with respect to FIG. 1.

For example, an enhanced memory protocol may include an "initialize" signal (or command) configured to load firmware from, for example, a flash memory module, such as module 106 described above with respect to FIG. 1, and initialize the memory-integrated-accelerator.

The enhanced memory protocol may further include a "data" signal (or command) configured to initiate the process for moving data from the memory elements allocated to system memory (e.g., 312D-F in FIG. 3B) on an enhanced memory module (e.g., 102 in FIG. 1, 224A-B in FIGS. 2, and 302 in FIGS. 3A-C) to compute core memory elements (e.g., 312A-C in FIG. 3B), such as by the method described with respect to FIG. 4, which may be static or dynamically allocated as described above.

The "data" signal may have variants, such as: "move all data", where all data between a start and end address are moved between system allocated memory and compute core allocated memory; "move x bytes", where x data bytes are moved from the system allocated memory to compute core allocated memory; and "move for x cycles" where x cycles will be utilized to move data from system allocated memory to compute core allocated memory.

The enhanced memory protocol may further include a "process" signal (or command) configured to cause the compute core of an enhanced memory module (e.g., 102 in FIG. 1, 224A-B in FIGS. 2, and 302 in FIGS. 3A-C) to begin executing the instructions that have been stored in the compute core allocated memory, such as by the method described with respect to FIG. 6.

The enhanced memory protocol may further include a "results" signal (or command) configured to initiate the process for moving data from the compute core allocated memory (e.g., 312A-C in FIG. 3B) to the system allocated memory (e.g., 312D-F in FIG. 3B) so that it may be accessed by other parts of the host processing system (e.g., system 200 in FIG. 2), such as by the method described with respect to FIG. 5.

Thus, in one example, an accelerator driver (e.g., 216 in FIG. 2) sends the "data" signal and a memory driver (e.g., 214 in FIG. 2) forwards the signal to an enhanced memory module (e.g., 224A-B in FIG. 2). The accelerator driver tells the memory driver to block traffic, which could be a single command with the "data" command or a separate command. The memory driver then blocks all traffic not coming from the accelerator driver. In some cases, the traffic may be held or sent back for retry. The enhanced memory module may also set a value in a buffer to output a data pattern indicative of a memory transfer status. For example, the accelerator driver may request data from the enhanced memory module (which the memory driver forwards) and if the data pattern is "busy", then the accelerator driver waits and tries again, and if the data pattern is "complete", then the accelerator driver tells the memory driver to allow traffic again.

Example Method for Constructing an Enhanced Memory Module

Figure 7:
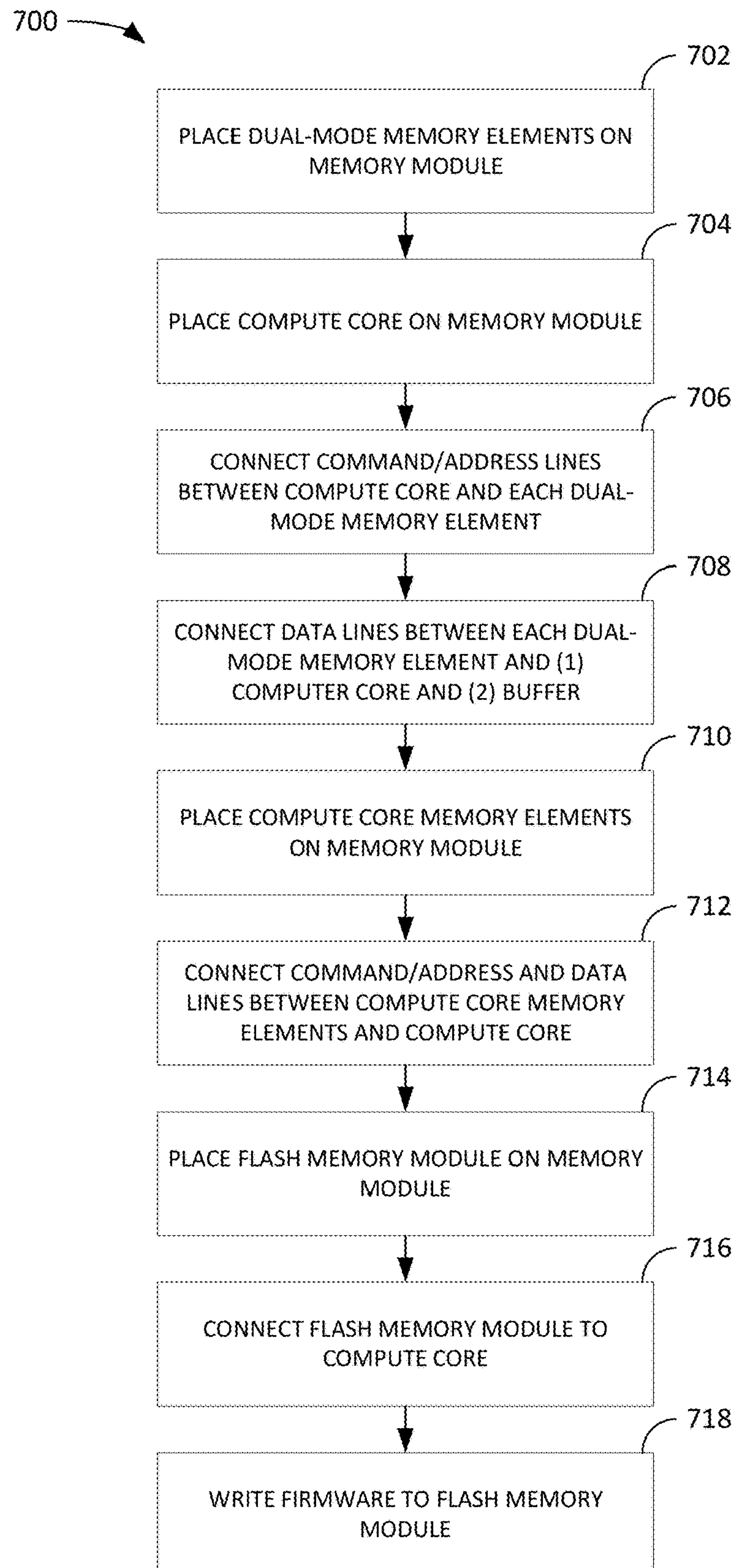
FIG. 7 depicts an example method for constructing an enhanced memory module

FIG. 7 depicts an example method 700 for constructing an enhanced memory module (e.g., 102 in FIG. 1, 224A-B in FIGS. 2, and 302 in FIGS. 3A-C).

Method 700 begins at step 702 with placing dual-mode memory elements on an enhanced memory module, such as memory elements 112A-F on enhanced memory module 102 in FIG. 1. In this example, "dual-mode" refers to each memory element's ability to be used for system memory in a conventional fashion as well as for local memory for the on-module compute core(s), such as 108 in FIG. 1. The memory elements need not be physically modified to work in either mode.

Method 700 then proceeds to step 704 with placing a compute core on the enhanced memory module, such as compute core(s) 108 in FIG. 1.

Method 700 then proceeds to step 706 with connecting command/address lines between the compute core(s) and each dual-mode memory element. Command/address lines may be configured to transport signals used to determine which parts of the memory are accessed and determine what the command is.

Method 700 then proceeds to step 708 with connecting data lines between each dual-mode memory element and the compute core(s) (for use in a local processing mode) and a memory buffer (for use in a system memory mode).

Method 700 then proceeds to step 710 with placing compute core memory elements on the enhanced memory module, such as memory elements 110A-B of enhanced memory module 102 in FIG. 1.

Method 700 then proceeds to step 712 with connecting command/address lines and data lines between the compute core(s) and the compute core memory elements.

Method 700 then proceeds to step 714 with placing a flash memory module on the enhanced memory module, such as flash memory module 106 of enhanced memory module 102 in FIG. 1.

Method 700 then proceeds to step 716 with connecting the flash memory module to the compute core(s), such as compute core(s) 108 of enhanced memory module 102 in FIG. 1.

Method 700 then proceeds to step 718 with writing firmware to the flash memory module for initializing the enhanced memory module, such as enhanced memory module 102 of FIG. 1).

Notably, method 700 is just one high-level example of how to construct an enhanced memory module, such as enhanced memory module 102 of FIG. 1, and many other examples exist. Discussion of specific fabrication techniques is omitted for clarity.

Figure 8:
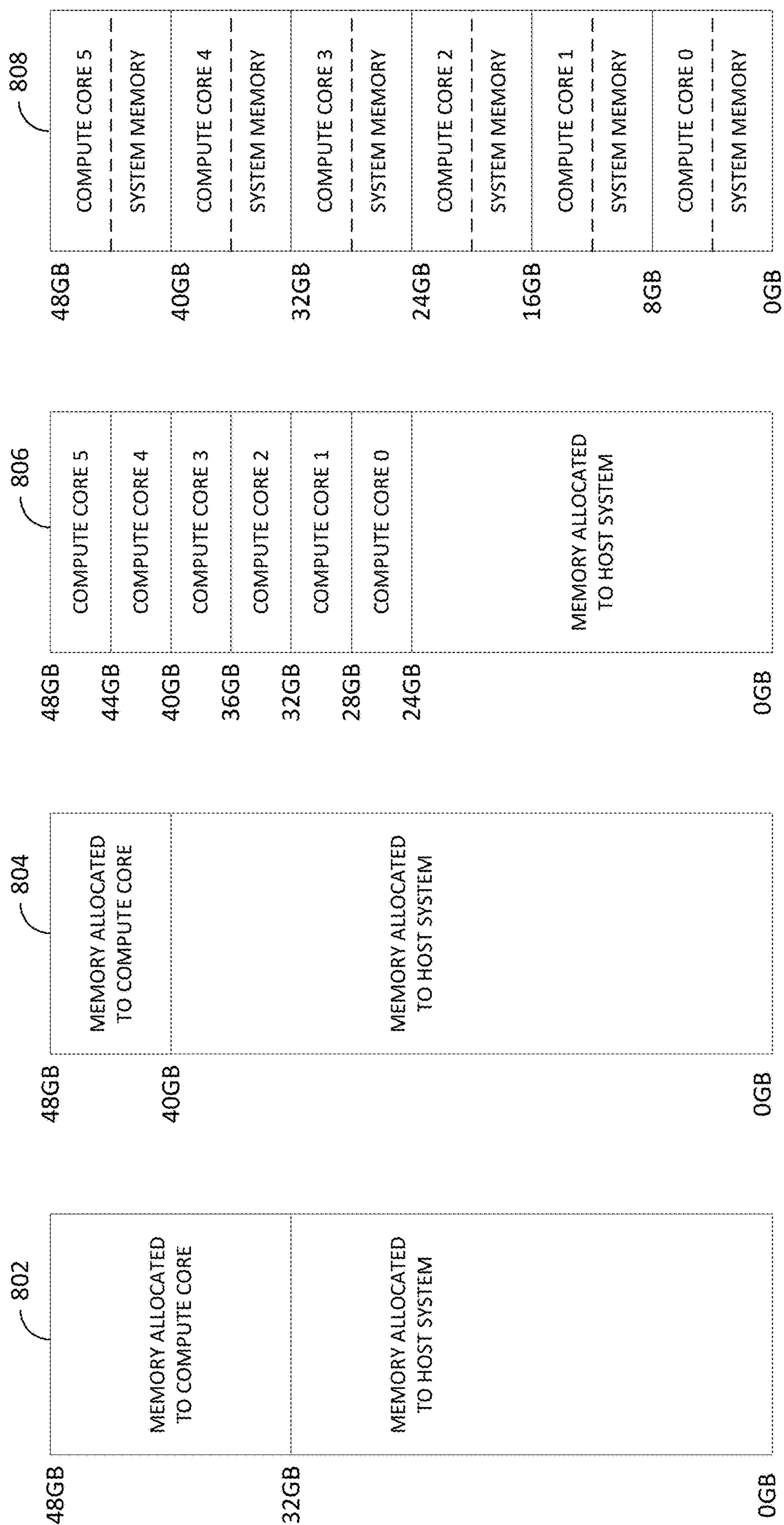
FIG. 8 depicts example memory mappings for processing systems including enhanced memory modules.

Example Memory Mappings for Processing Systems Including Enhanced Memory Modules FIG. 8 depicts example memory mappings for processing systems including enhanced memory modules (e.g., 102 in FIG. 1, 224A-B in FIGS. 2, and 302 in FIGS. 3A-C).

In the depicted example, a processing system has six memory module slots (e.g., 6 DIMM slots) and each memory module in each DIMM slot has 8 GB of system addressable memory, for a total of 48 GB of system memory. The memory module in each DIMM slot may be a conventional memory module or an enhanced memory module, such that the system as a whole may be a "hybrid configuration", having a mix of conventional an enhanced memory modules, or may be an "enhanced configuration", having all enhanced memory modules. Because enhanced memory modules may be configured to allocate memory between a host processing system and an on-memory processing element (e.g., to a compute core, such as 108 in FIG. 1), the more enhanced memory modules are present in the system, the more total memory there is available to allocate to on-memory processing.

Further in this example, a memory allocation threshold is implemented such that up to half of the memory in any enhanced memory module may be allocated to on-memory processing (e.g., to a compute core, such as 108 in FIG. 1), and the remaining memory is allocated to the host processing system. In other embodiments, the memory allocation threshold may not be implemented, or may be implemented with a different value. A memory threshold may generally be established to ensure that the host processing system maintains enough allocated memory to perform properly.

Memory maps 802 or 804 depict example memory allocations in a processing system having a hybrid configuration of memory modules. Memory maps 806 and 808 depict example memory allocations in a processing system having an enhanced configuration, wherein all memory modules are enhanced memory modules. In the depicted examples, the memory allocations in the enhanced configurations of 806 and 808 include more memory allocated to compute cores for on-memory processing.

Further, the memory allocations in memory maps 806 and 808 are specific to the compute cores of each enhanced memory module (e.g., enhanced memory modules 0-5). However, in other examples, memory may be generally allocated to compute cores as a set, such as in the example memory maps 802 and 804, rather than specifically, as in the example memory maps 806 and 808.

Generally speaking, having more enhanced memory modules increases the amount of memory that may be allocated to on-memory processing, thereby improving a host processing system's ability to perform, for example, AI and ML specific tasks such as training and inferencing, as well as increases the flexibility with which the total system memory may be configured.

In the case of a dynamic reallocation of memory between host processing system and on-memory processing (e.g., via an accelerator like 104 of FIG. 1) a memory map may be updated accordingly. For example, memory map 802 may be updated to memory map 806, or other combinations.

The examples depicted in FIG. 8 are meant to be demonstrative of but a few examples of various memory configurations using enhanced memory modules, and others are possible.

Example Method for Processing Data With an Enhanced Memory Module

Figure 9:
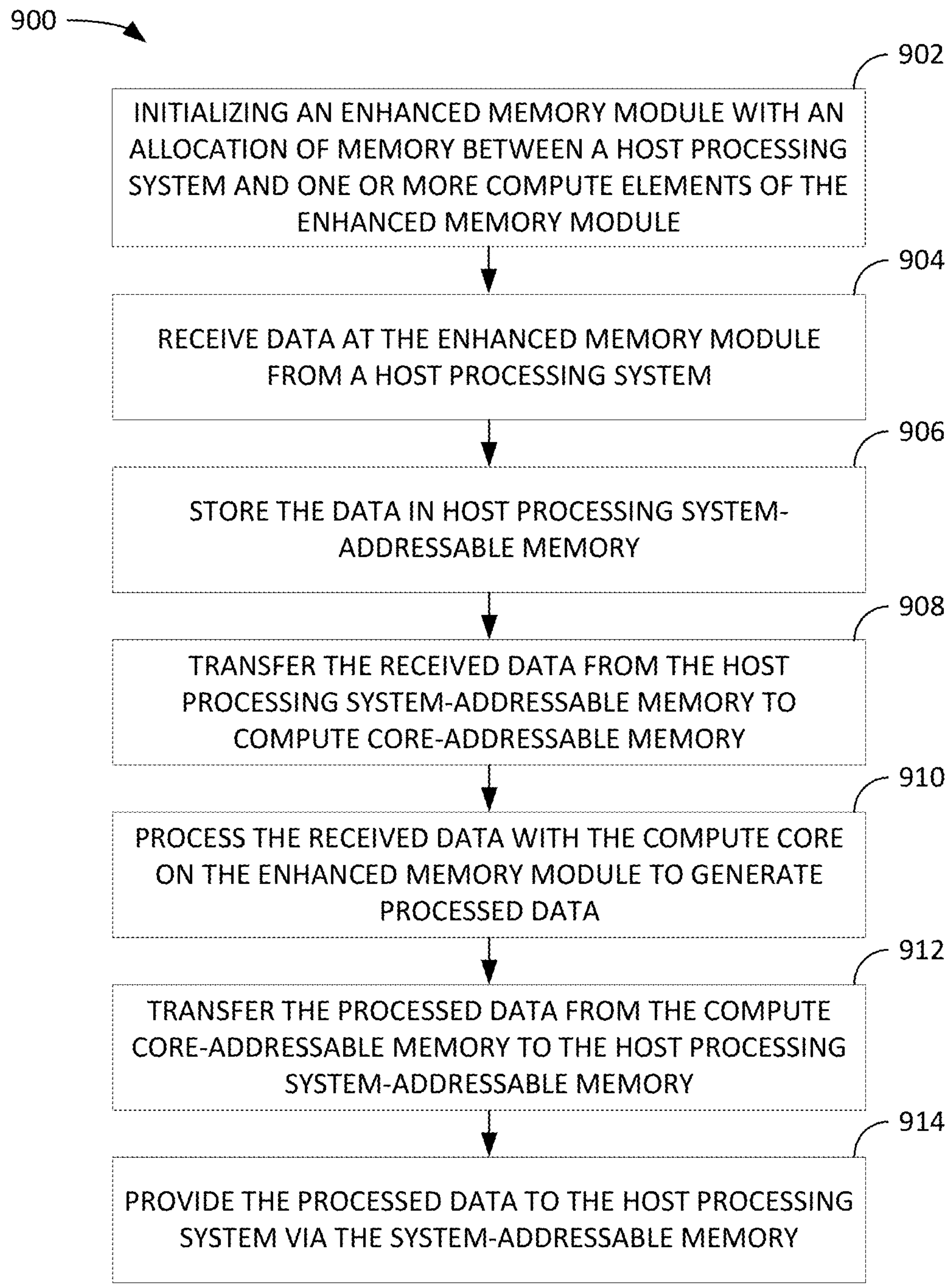
FIG. 9 depicts an example method for processing data with an enhanced memory module comprising a compute core.

FIG. 9 depicts an example method 900 for processing data with an enhanced memory module (e.g., 102 in FIG. 1, 224A-B in FIGS. 2, and 302 in FIGS. 3A-C) comprising a compute core (e.g., 108 in FIG. 1). In some embodiments, the compute core may be a part of a memory-integrated accelerator, such as 104 of FIG. 1. In some embodiments, the compute core may comprise a plurality of processing elements, such as a plurality of individual processing cores. In some embodiments, the enhanced memory module comprises a Load-Reduced Dual Inline Memory Module (LRDIMM).

Method 900 begins at step 902 with initializing the enhanced memory module by allocating a first subset of memory of the enhanced memory module as host processing system-addressable memory and a second subset of memory of the enhanced memory module as compute core-addressable memory, such as described, for example, with respect to FIGS. 3A-3C.

In some embodiments of method 900, the initialization of the enhanced memory module may be performed at boot time. In other embodiments, the initialization of the enhanced memory module may be performed dynamically during operation of the host processing system.

In some embodiments, the allocation of memory may comprise allocating memory of one or more dual-mode memory elements, such as memory elements 112A-F in FIG. 1, between the compute core and the host processing system. For example, the allocation may comprise one or more memory ranges or memory address spaces, such as virtual address spaces or physical address spaces.

Method 900 the proceeds to step 904 with receiving data at the enhanced memory module from the host processing system. The data may be provided by the host processing system to the enhanced memory module for processing on the enhanced memory module, such as by the compute core.

In some embodiments, the received data may include data for processing by a machine learning model and machine learning model parameters. In some embodiments, the received data may further include processing commands or instructions.

Method 900 then proceeds to step 906 with storing the received data in first subset of memory (the host processing system-addressable memory). In some embodiments, the host processing system addressable memory comprises memory space allocated to the host processing system in one or more dual-mode memory elements on the enhanced memory module, such as memory elements 112A-F in FIG. 1.

Method 900 then proceeds to step 908 with transferring the received data from the first subset of memory (host processing system-addressable memory) to the second subset of memory (compute core-addressable memory).

In some embodiments, the compute core-addressable memory comprises non-host processing system-addressable memory, such as memory elements 110A-B in FIG. 1. In some embodiments, the compute core-addressable memory comprises only non-host processing system-addressable memory (such as in the example of FIG. 3A).

Method 900 then proceeds to step 910 with processing the received data with the compute core on the enhanced memory module to generate processed data.

Method 900 then proceeds to step 912 with transferring the processed data from the second subset of memory (compute core-addressable memory) to first subset of memory (the host processing system-addressable memory).

Method 900 then proceeds to step 914 with providing the processed data to the host processing system via the first subset of memory (host processing system-addressable memory), such as described above with respect to FIG. 2.

In some embodiments, initializing the enhanced memory module comprises processing firmware instructions stored in a flash memory module on the enhanced memory module, such as described above with respect to FIG. 1.

In some embodiments, method 900 further includes, prior to transferring the data from the first subset of memory (host processing system-addressable memory) to the second subset of memory (compute core-addressable memory), setting a busy state on a data bus of the host processing system to indicate that a transfer of data is taking place and to block read requests to the host processing system-addressable memory, such as described above with respect to FIG. 4.

In some embodiments, method 900 further includes, after transferring the data from the first subset of memory (host processing system-addressable memory) to the second subset of memory (compute core-addressable memory), setting an available state on the data bus of the host processing system to allow read or write requests from the host processing system to the host processing system-addressable memory, such as described above with respect to FIG. 4.

In some embodiments, method 900 further includes, prior to transferring the data from the first subset of memory (host processing system-addressable memory) to the second subset of memory (compute core-addressable memory), enabling a block of host processing system memory commands for the enhanced memory module, such as described above with respect to FIG. 4.

In some embodiments, method 900 further includes, after transferring the data from the first subset of memory (host processing system-addressable memory) to the second subset of memory (compute core-addressable memory), disabling the block of host processing system memory commands for the enhanced memory module, such as described above with respect to FIG. 4.

In some embodiments, method 900 further includes reallocating the memory of the enhanced memory module by deallocating the first subset of memory and second subset of memory, and allocating a third subset of memory in the one or more dual-mode memory elements as host processing system-addressable memory and a fourth subset of memory in the one or more dual-mode memory elements as compute core-addressable memory, wherein the third subset of memory is different than the first subset, and wherein the fourth subset of memory is different than the second subset. In some embodiments, the reallocation is performed after boot time, such as when the host processing system is running. As such, the reallocation may be referred to as a dynamic or "hot" reallocation of memory.

For example, in some embodiments, a first allocation, such as that of FIG. 3A, may be dynamically reallocated to a second allocation, like that of FIGS. 3B or 3C, or others not depicted. In some embodiments, the host processing system may be blocked from sending memory commands to the enhanced memory module during the reallocation process. In some embodiments, a page table or memory map may be updated after the reallocation so that physical memory no longer accessible to, or newly accessible to, the host processing system is properly configured. For example, the memory maps examples in FIG. 8 may be updated after a reallocation of memory on an enhanced memory module.

Example Electronic Device for Data Processing With Enhanced Memory Modules

Figure 10:
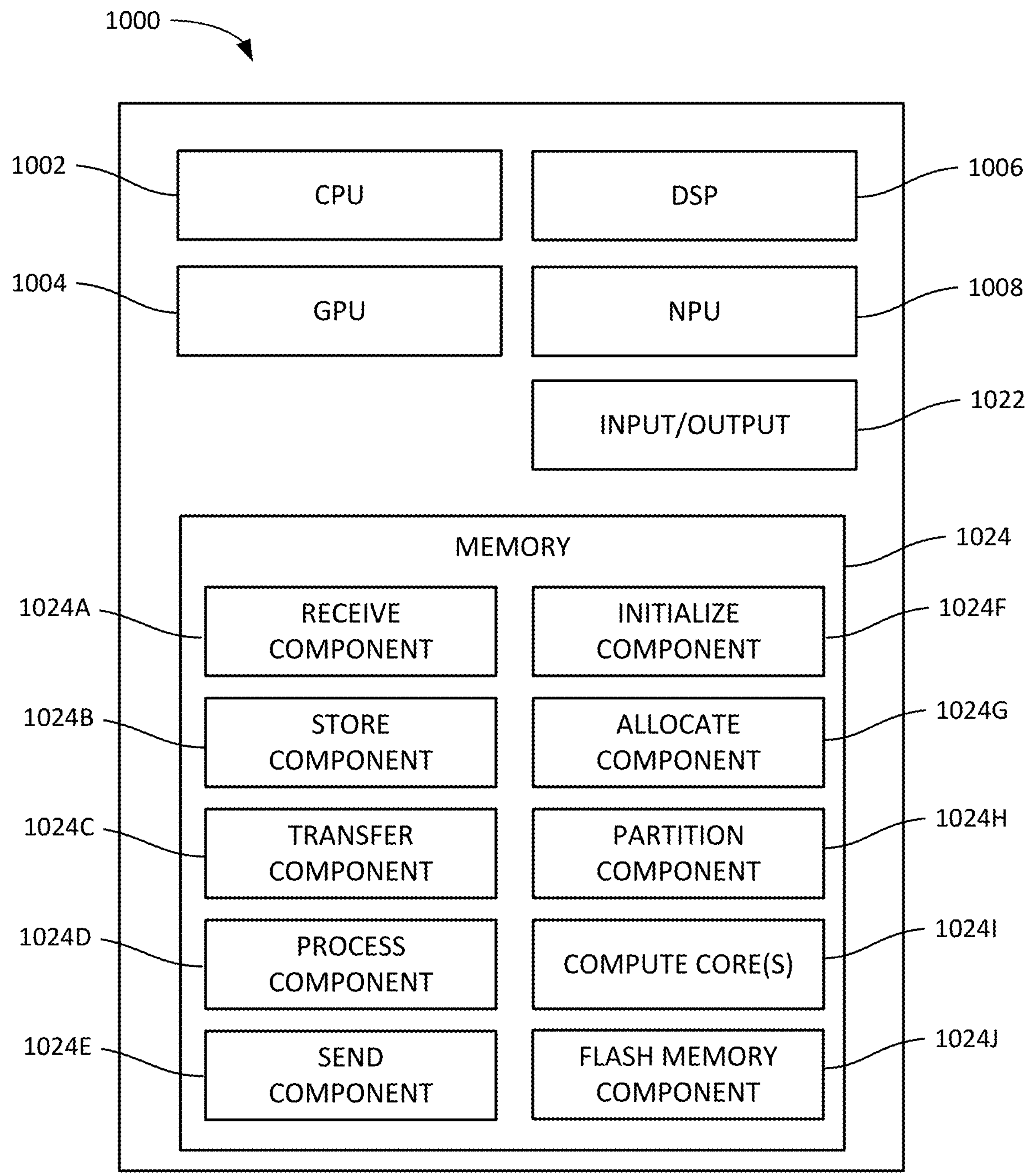
FIG. 10 depicts an example electronic device that may be configured to perform data processing with enhanced memory modules.

FIG. 10 depicts an example electronic device 1000 that may be configured to perform data processing with enhanced memory modules, such as described herein for example with respect to FIGS. 4-6 and 9. In some embodiments, electronic device 1000 may comprise a server computer.

Electronic device 1000 includes a central processing unit (CPU) 1002, which in some examples may be a multi-core CPU. Instructions executed at the CPU 1002 may be loaded, for example, from a program memory associated with the CPU 1002 or may be loaded from a memory partition 1024.

Electronic device 1000 also includes additional processing components tailored to specific functions, such as a graphics processing unit (GPU) 1004, a digital signal processor (DSP) 1006, and a neural processing unit (NPU) 1008.

An NPU, such as 1008, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs may be optimized for training or inference, or in some cases configured to balance performance between both. For NPUs that are capable of performing both training and inference, the two tasks may still generally be performed independently.

For example, NPUs, such as 1008, may be configured to accelerate the performance of common machine learning inferencing tasks, such as image classification, machine translation, object detection, and various other predictive models. In some examples, a plurality of NPUs may be instantiated on a single chip, such as a system on a chip (SoC), while in other examples they may be part of a dedicated neural-network accelerator. NPUs designed to accelerate inference are generally configured to operate on complete models. Such NPUs may thus be configured to input a new piece of data and rapidly process it through an already trained model to generate a model output (e.g., an inference).

As another example, NPUs may be configured to accelerate common machine learning training tasks, such as processing test datasets (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

In one implementation, NPU 1008 is a part of one or more of CPU 1002, GPU 1004, and/or DSP 1006.

Electronic device 1000 may also include one or more input and/or output devices 1022, such as screens, network interfaces, physical buttons, and the like.

Electronic device 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of electronic device 1000.

Memory 1024 may be representative of one or more memory modules, such as the enhanced memory modules described herein (e.g., with respect to FIGS. 1, 2, and 3). For example, memory 1024 may comprise one or more compute core(s) 10241 and a flash memory component 1024J. In some cases, compute core(s) 10241 may comprise NPUs or other sorts of processors as described herein. Further, though not depicted, some of memory 1024 may be accessible only by compute core(s) 1024J, while some memory may be configurable to be accessible by the processing system 1000 or by compute cores 1024J.

In this example, memory 1024 includes receive component 1024A, store component 1024B, transfer component 1024C, process component 1024D, send (or provide) component 1024E, initialize component 1024F, allocate component 1024G, and partition component 1024H. The depicted components, and others not depicted, may be configured to perform various aspects of the methods described herein.

Though not depicted in FIG. 10, electronic device 1000 may further include one or more data busses for transferring data between various aspects of electronic device 1000.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An enhanced memory module, comprising:

a compute core; and one or more dual-mode memory elements, each dual-mode memory element of the one or more dual-mode memory elements being dynamically allocable to the compute core for on-memory-module processing or to a host processing system, wherein the enhanced memory module is configured to:

receive at least a portion of a workload, wherein the portion of the workload is determined by an accelerator module based on a capacity of the enhanced memory module and a total number of enhanced memory modules being used for the workload;

allocate, based on the received portion of the workload and dynamic configuration information from a host processing system, a first subset of memory in the one or more dual-mode memory elements as host processing system-addressable memory reserved for the host processing system and a second subset of memory in the one or more dual-mode memory elements as compute core-addressable memory that the host processing system cannot use;

receive data from the host processing system;

process the data with the compute core to generate processed data; and provide the processed data to the host processing system via the first subset of memory.

2. The enhanced memory module of claim 1, wherein the enhanced memory module is further configured to:

store the received data in the first subset of memory;

transfer the received data from the first subset of memory to the second subset of memory prior to processing the data with the compute core; and transfer the processed data from the second subset of memory to the first subset of memory after processing the data with the compute core.

3. The enhanced memory module of claim 1, wherein the second subset of memory further comprises one or more single-mode memory configured for use by the compute core.

4. The enhanced memory module of claim 1, further comprising: a flash memory module comprising firmware instructions for allocating the first subset of memory and the second subset of memory.

5. The enhanced memory module of claim 1, wherein the enhanced memory module is further configured to set a busy state on a data bus of the host processing system to indicate that a transfer of data is taking place prior to transferring the data from the first subset of memory to the second subset of memory.

6. The enhanced memory module of claim 5, wherein the enhanced memory module is further configured to: set an available state on the data bus of the host processing system after transferring the data from the first subset of memory to the second subset of memory.

7. The enhanced memory module of claim 1, wherein the enhanced memory module is further configured to: enable a block of host processing system memory commands for the enhanced memory module prior to transferring the data from the first subset of memory to the second subset of memory.

8. The enhanced memory module of claim 7, wherein the enhanced memory module is further configured to: disable the block of host processing system memory commands for the enhanced memory module after transferring the data from the first subset of memory to the second subset of memory.

9. The enhanced memory module of claim 1, wherein the data comprises:

data for processing by a machine learning model; and machine learning model parameters.

10. The enhanced memory module of claim 1, wherein the enhanced memory module comprises a Dual Inline Memory Module (DIMM).

11. The enhanced memory module of claim 1, wherein the enhanced memory module is further configured to:

deallocate the first subset of memory and second subset of memory; and allocate a third subset of memory in the one or more dual-mode memory elements as host processing system-addressable memory and a fourth subset of memory in the one or more dual-mode memory elements as compute core-addressable memory, wherein the third subset of memory is different than the first subset of memory, and wherein the fourth subset of memory is different than the second subset of memory.

12. The enhanced memory module of claim 1, wherein the allocation is performed to maximize performance of the enhanced memory module and the one or more other enhanced memory modules across the workload and one or more other workloads executing on the enhanced memory module and the one or more other enhanced memory modules.

13. A method for processing data with an enhanced memory module comprising a compute core, comprising:

receiving at least a portion of a workload, wherein the portion of the workload is determined by an accelerator module based on a capacity of the enhanced memory module and a total number of enhanced memory modules being used for the workload;

initializing the enhanced memory module by allocating, based on the received portion of the workload and a dynamic configuration information by a host processing system, a first subset of memory of the enhanced memory module as host processing system-addressable memory reserved for a host processing system and a second subset of memory of the enhanced memory module as compute core-addressable memory that the host processing system cannot use, wherein a size of the first subset of memory and a size of the second subset of memory is dynamically configured by the host processing system, and wherein the first subset of memory and the second subset of memory are associated with one or more dual-mode memory elements of the enhanced memory module, each dual-mode memory element of the one or more dual-mode memory elements being dynamically allocable to the compute core for on-memory-module processing or to a host processing system;

processing the data with the compute core on the enhanced memory module to generate processed data; and providing the processed data to the host processing system via the first subset of memory.

14. The method of claim 13, further comprising:

storing the received data in the first subset of memory;

transferring the received data from the first subset of memory to the second subset of memory prior to processing the data with the compute core; and transferring the processed data from the second subset of memory to the first subset of memory after processing the data with the compute core.

15. The method of claim 14, further comprising: prior to transferring the data from the first subset of memory to the second subset of memory, setting a busy state on a data bus of the host processing system to indicate that a transfer of data is taking place.

16. The method of claim 15, further comprising: after transferring the data from the first subset of memory to the second subset of memory, setting an available state on the data bus of the host processing system.

17. The method of claim 14, further comprising: prior to transferring the data from the first subset of memory to the second subset of memory, enabling a block of host processing system memory commands for the enhanced memory module.

18. The method of claim 17, further comprising: after transferring the data from the first subset of memory to the second subset of memory, disabling the block of host processing system memory commands for the enhanced memory module.

19. The method of claim 13, wherein the first subset of memory and the second subset of memory are associated with one or more dual-mode memory elements.

20. The method of claim 13, wherein initializing the enhanced memory module comprises processing firmware instructions stored in a flash memory module on the enhanced memory module.

21. The method of claim 13, wherein the second subset of memory is further associated with one or more single-mode memory elements configured for use by the compute core.

22. The method of claim 13, wherein the data comprises:

data for processing by a machine learning model; and machine learning model parameters.

23. The method of claim 13, wherein the enhanced memory module comprises a Dual Inline Memory Module (DIMM).

24. The method of claim 13, further comprising:

deallocating the first subset of memory and second subset of memory; and allocating a third subset of memory of the enhanced memory module as host processing system-addressable memory and a fourth subset of memory of the enhanced memory module as compute core-addressable memory, wherein the third subset of memory is different than the first subset of memory, and wherein the fourth subset of memory is different than the second subset of memory.

25. A non-transitory computer-readable medium comprising instructions that, when executed by one or more processors of a host processing system, cause the host processing system to perform a method for processing data with an enhanced memory module comprising a compute core, the method comprising:

receiving at least a portion of a workload, wherein the portion of the workload is determined by an accelerator module based on a capacity of the enhanced memory module and a total number of enhanced memory modules being used for the workload;

initializing the enhanced memory module by allocating the received portion of the workload and dynamic configuration information received from the host processing system, a first subset of memory of the enhanced memory module as host processing system-addressable memory reserved for the host processing system and a second subset of memory of the enhanced memory module as compute core-addressable memory that the host processing system cannot use, wherein the first subset of memory and the second subset of memory are associated with one or more dual-mode memory elements of the enhanced memory module, each dual-mode memory element of the one or more dual-mode memory elements being dynamically allocable to the compute core for on-memory-module processing or to a host processing system;

receiving data at the enhanced memory module from the host processing system;

processing the data with the compute core on the enhanced memory module to generate processed data; and providing the processed data to the host processing system via the first subset of memory.

26. The non-transitory computer-readable medium of claim 25, wherein the method further comprises:

storing the received data in the first subset of memory;

transferring the received data from the first subset of memory to the second subset of memory prior to processing the data with the compute core; and transferring the processed data from the second subset of memory to the first subset of memory after processing the data with the compute core.

27. The non-transitory computer-readable medium of claim 26, wherein the method further comprises: prior to transferring the data from the first subset of memory to the second subset of memory, setting a busy state on a data bus of the host processing system to indicate that a transfer of data is taking place.

28. The non-transitory computer-readable medium of claim 27, wherein the method further comprises: after transferring the data from the first subset of memory to the second subset of memory, setting an available state on the data bus of the host processing system to allow.

29. The non-transitory computer-readable medium of claim 26, wherein the method further comprises:

prior to transferring the data from the first subset of memory to the second subset of memory, enabling a block of host processing system memory commands for the enhanced memory module; and after transferring the data from the first subset of memory to the second subset of memory, disabling the block of host processing system memory commands for the enhanced memory module.

30. The non-transitory computer-readable medium of claim 25, wherein the second subset of memory is further associated with one or more single-mode memory elements configured for use by the compute core.

* * * * *